(12) United States Patent
Grummett et al.

(10) Patent No.: US 7,887,126 B2
(45) Date of Patent: Feb. 15, 2011

(54) SEAL ASSEMBLY FOR A MOTOR VEHICLE

(75) Inventors: David B. Grummett, Dublin, OH (US);
Brent Nathaniel Gaertner, Columbus, OH (US); Akihiko Kuribayashi, Dublin, OH (US); Kenneth M. Hartlaub, Powell, OH (US); Brock Jared Stull, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 12/479,358

(22) Filed: Jun. 5, 2009

(65) Prior Publication Data
US 2010/0308626 A1    Dec. 9, 2010

(51) Int. Cl.
*B60J 10/12* (2006.01)

(52) U.S. Cl. ............................. 296/216.06; 296/216.07; 49/500.1

(58) Field of Classification Search ................................
206/216.06–216.09, 216.02–216.03, 218; 49/500.1
See application file for complete search history.

(56) References Cited

U.S. PATENT DOCUMENTS

| | | | | |
|---|---|---|---|---|
| 3,974,753 A | * | 8/1976 | Blomgren et al. | 296/218 |
| 4,469,370 A | * | 9/1984 | Petersen | 296/218 |
| 4,688,847 A | | 8/1987 | Freudenberg | |
| 4,749,225 A | * | 6/1988 | Fuerst et al. | 296/216.03 |
| 4,893,869 A | * | 1/1990 | Fuerst | 296/216.03 |
| 5,331,767 A | | 7/1994 | Takeuchi et al. | |

FOREIGN PATENT DOCUMENTS

| | | |
|---|---|---|
| DE | 43 25 501 A1 | 2/1995 |
| JP | 58-118414 | 7/1983 |
| JP | 8-48149 | 2/1996 |
| JP | 2005-112120 | 4/2005 |

* cited by examiner

*Primary Examiner*—Dennis H Pedder
(74) *Attorney, Agent, or Firm*—Rankin Hill & Clark LLP

(57) ABSTRACT

A seal assembly includes a vehicle frame, a moveable panel connected with and moveable with respect to the vehicle frame, and a seal connected with the vehicle frame. The moveable panel is moveable between an open position and a closed position. The seal includes a seal body having an external surface including an ambient-contacting section that is in contact with ambient when the moveable panel is in the closed position. The external surface of the seal body also includes a moveable-panel-contacting section that is in contact with the moveable panel when the moveable panel is in the closed position. The ambient-contacting section can move from a first orientation when the moveable panel is in the closed position toward a second orientation as the moveable panel contacts the moveable-panel-contacting section and moves toward the closed position. A seal for a vehicle and a roof assembly are also described.

18 Claims, 2 Drawing Sheets

SEAL ASSEMBLY FOR A MOTOR VEHICLE

BACKGROUND

This disclosure relates to a seal or weatherstrip arrangement for a motor vehicle.

Seals, also referred to as weatherstrips, are useful for providing a sealing arrangement between a moveable panel of a vehicle, e.g., a door, a roof panel, a trunk lid, a hood, and the vehicle frame. The seal acts to prevent the ingress of elements, e.g. rain, from entering into the interior cabin of the vehicle.

FIG. 1 depicts a cross section of a seal arrangement for a motor vehicle. In FIG. 1, a seal 10 is affixed to a vehicle frame 12 and is located between a first panel 16 and a second panel 18. In this seal arrangement, the first panel 16 is a moving panel that can move in the direction of arrow 22. The moving panel 16 is shown in the closed position. The second panel 18 depicted in FIG. 1 is fixed to the vehicle frame 12, i.e., the second panel is not moveable with respect to the vehicle frame. The seal 10 is disposed between the moveable panel 16 and the fixed panel 18 to close a gap 24 between the panels 16 and 18 to seal the vehicle cabin from the outside elements.

In FIG. 1, the seal 10 only partially fills the volume of the gap 24 and leaves the adjacent edges 26, 28 of the panels 16 and 18 exposed. Because of the exposed edges 26, 28 and that the gap 24 includes voids adjacent each panel edge, turbulence is created as air flows over these voids. This turbulence can result in high noise levels inside the vehicle cabin.

Encapsulation of the panels 16, 18, particularly where the panels 16, 18 are made of glass, can substantially reduce the void between each respective panel edge 26, 28 and the seal 10 by eliminating the void between the panels 16, 18. Encapsulation tooling, however, is very expensive.

SUMMARY

An example of a seal assembly that can overcome the aforementioned shortcomings includes a vehicle frame, a moveable panel connected with and moveable with respect to the vehicle frame, and a seal connected with the vehicle frame. The moveable panel is moveable between an open position and a closed position. The seal includes a seal body having an external surface including an ambient-contacting section that is in contact with ambient when the moveable panel is in the closed position. The external surface of the seal body also includes a moveable-panel-contacting section that is in contact with the moveable panel when the moveable panel is in the closed position. The ambient-contacting section can move from a first orientation when the moveable panel is in the closed position toward a second orientation as the moveable panel contacts the moveable-panel-contacting section and moves toward the closed position.

An example of a seal for an associated vehicle that can overcome the aforementioned shortcomings includes a seal body and an external surface. The seal body includes a compressible section. The external surface includes a panel-contacting section surrounding at least a portion of the compressible section and a substantially flat section that is more rigid than the compressible section. A compressive force applied at a location on the panel-contacting section can result in the compressive section compressing and an end of the substantially flat section nearest the panel-contacting section can move in a direction toward the location where the compressive force is applied.

An example of a roof assembly that can overcome the aforementioned shortcomings includes a vehicle frame, a first roof panel connected with the vehicle frame, a second roof panel connected with the vehicle frame, and a seal contacting the vehicle frame. The first roof panel connects with the vehicle frame and includes an inner surface, an outer surface and a seal-contacting edge between the inner surface and the outer surface. The first roof panel is moveable with respect to the vehicle frame between an open position and a closed position. The seal contacts the vehicle frame and the first roof panel when the first roof panel is in the closed position. The seal includes a substantially flat exterior surface. The seal contacts a seal-contacting edge of the first roof panel at a location nearer the outer surface of the first roof panel as compared to the inner surface of the first roof panel when the first roof panel is in the closed position.

DETAILED DESCRIPTION

Figure 2:
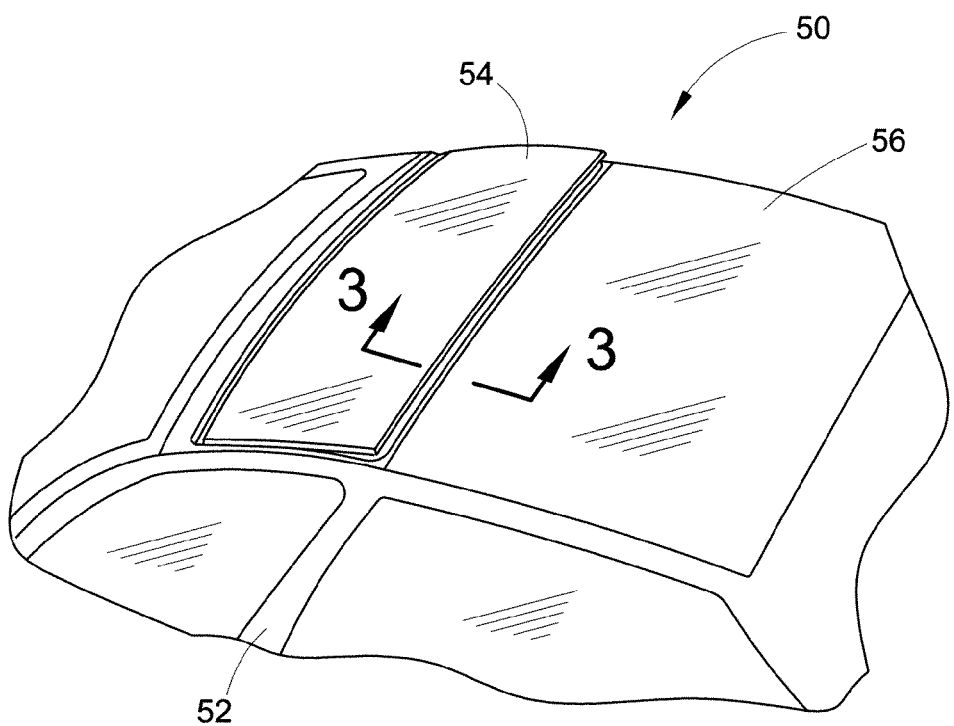
FIG. 2 is a perspective view of a portion of a vehicle with a moveable panel of the vehicle shown in an open position.

FIG. 2 depicts a vehicle 50 having a vehicle frame 52, which is similar to known vehicle frames. The vehicle frame 52 is made from a plurality of interconnected components that are typically made from metal, but other materials can also be used. FIG. 2 also depicts a first panel 54 connected with the vehicle frame 52 and a second panel 56 connected with the vehicle frame. In the embodiment depicted in FIG. 2, the first panel 54 is a moveable panel that is connected with and moveable with respect to the vehicle frame 52, while the second panel 56 is fixed in that it is not moveable with respect to the vehicle frame 52. More particular to the embodiment illustrated in FIG. 2, both panels 54 and 56 are glass roof panels; however, the seal arrangement that will be described in more detail below can be used with other panels that are moveable with respect to the vehicle frame, e.g. doors, windows, hoods, trunk lids and the like.

Figure 3:
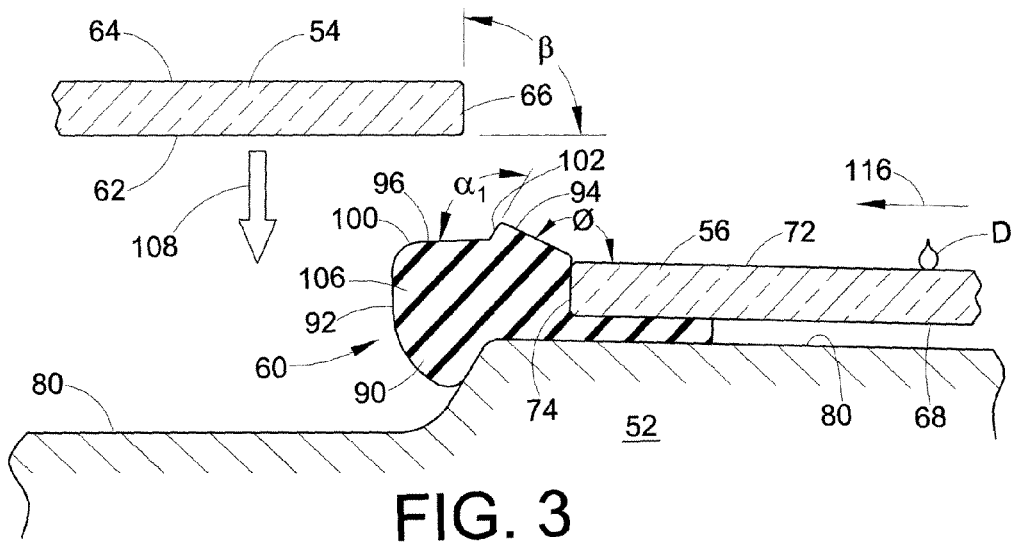
FIG. 3 is a cross-sectional view taken along line 3-3 of FIG. 2 showing the moveable panel in the open position.
Figure 4:
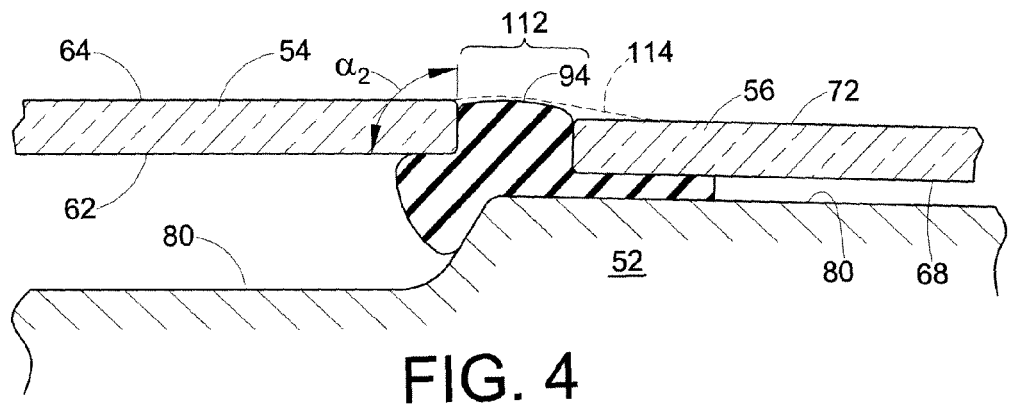
FIG. 4 is a cross-sectional view similar to FIG. 3 with the moveable panel shown in a closed position.

FIG. 3 depicts a seal arrangement for the vehicle 50 (FIG. 2) including the vehicle frame 52, the moveable panel 54 connected with and moveable with respect to the vehicle frame, and a seal 60 connected with the vehicle frame. The moveable panel 54 is moveable with respect to the vehicle frame 52 between an open position (FIG. 3) and a closed position (FIG. 4). The moveable panel is moveable between multiple open positions, similar to a typical sunroof found in many known vehicles. The seal 60 operates similar to the seal 10 shown in FIG. 1 in that it prevents the ingress of elements, e.g. rain, from entering the vehicle cabin when the moveable panel 54 is in the closed position.

With reference to FIG. 3, the moveable panel 54 includes an inner surface 62, an outer surface 64 and an edge 66, which will be referred to as a seal-contacting edge, extending between and interconnecting the inner surface and the outer surface. The inner surface 62 of the moveable panel 54 and the seal-contacting edge 66 of the moveable panel intersect to define an angle β. In the illustrated embodiment, β is about 90°; however, the seal-contacting edge 66 as well as the inner surface 62 and the outer surface 64 can take slightly different configurations such that β can be other angles. Moreover, the inner surface 62, the outer surface 64, and the seal-contacting edge 66 are shown as generally planar in FIGS. 3-5, but the inner and outer surfaces and the edge can be curved or take other non-planar configurations. As shown, the inner and outer surfaces 62, 64 and the edge 66 can be smooth.

The fixed panel 56 also includes an inner surface 68, an outer surface 72, and a seal-contacting edge 74 that extends between and interconnects the inner surface and the outer surface. The fixed panel 56 is similar to the moveable panel 54 in that the inner surface 68 and the outer surface 72 are generally planar, as well as the seal-contacting edge 74 being generally planar. Just as with the moveable panel 54, the fixed panel 56 can take other configurations. Also, the inner and outer surfaces 68, 72 and the edge 74 can be smooth.

The vehicle frame 52 contacts the seal 60 at an outer surface 80 of the vehicle frame. The outer surface 80 of the vehicle frame 52 adjacent the seal 60 is generally stepped shaped. More particular to the illustrated embodiment, the outer surface 80 of the vehicle frame 52 adjacent the seal 60 steps away from the moveable panel 54 in the area adjacent the seal 60. In other words, the inner surface 68 of the fixed panel 56 is closer to the outer surface 80 of the vehicle frame 52 as compared to the inner surface 62 of a moveable panel 54.

With reference back to FIG. 3, the seal 60 includes a seal body 90 having an external surface 92. The seal 60 can be made from an extruded flexible material, e.g. a rubber-like material. The seal 60 could also be made from an injection molding process. The seal body 90 is compressed when the moveable panel 54 is in the closed position (FIG. 4).

The external surface 92 of the seal body 90 includes an ambient-contacting section 94 that is in contact with ambient when the moveable panel is in the closed position (see FIG. 4) and a moveable-panel-contacting section 96 that is in contact with the moveable panel 54 when the moveable panel is in the closed position. As seen when comparing FIG. 3 to FIG. 4, the ambient-contacting section 94 of the external surface 92 of the seal body 90 moves and/or pivots from a first orientation (shown in FIG. 3) when the moveable panel 54 is in the open position toward a second orientation (shown in FIG. 4) as the moveable panel 54 contacts the moveable-panel-contacting section 96 while moving toward the closed position. As can be seen in FIGS. 3 and 4, the movable-panel-contacting section 96 of the external surface 92 of the seal body 90 is generally step shaped in a cross section taken normal to a longitudinal axis of the seal 60.

The movable-panel-contacting section 96 in the illustrated embodiment includes a first leg surface 100 and a second leg surface 102. The first leg surface 100 and the second leg surface 102 intersect to define an angle, which is $\alpha_1$ when the movable panel 54 is in the open position (see FIG. 3). This angle, $\alpha_1$, is an obtuse angle in the illustrated embodiment. When the movable panel 54 is in the closed position, as shown in FIG. 4, the seal 60 deforms such that the first leg surface 100 and the second leg surface 102 intersect to define an angle $\alpha_2$. Another way to refer to this is that the first leg surface 100 and the second leg surface 102 define an angle $\alpha_1$ when the ambient-contacting section (the substantially flat section) 94 is in a first orientation (FIG. 3) and the first leg surface 100 and the second leg surface 102 define an angle $\alpha_2$ when the ambient contacting section (substantially flat section) 94 is in the second orientation (FIG. 4). In the illustrated embodiment, when the movable panel 54 is in the closed position (FIG. 4) $\alpha_2$ is about equal to β, which is the angle between the inner surface 62 of the movable panel 54 and the edge 66 of the movable panel 54. It can be preferred that $0.9<\alpha/\beta<1.1$.

Figure 1:
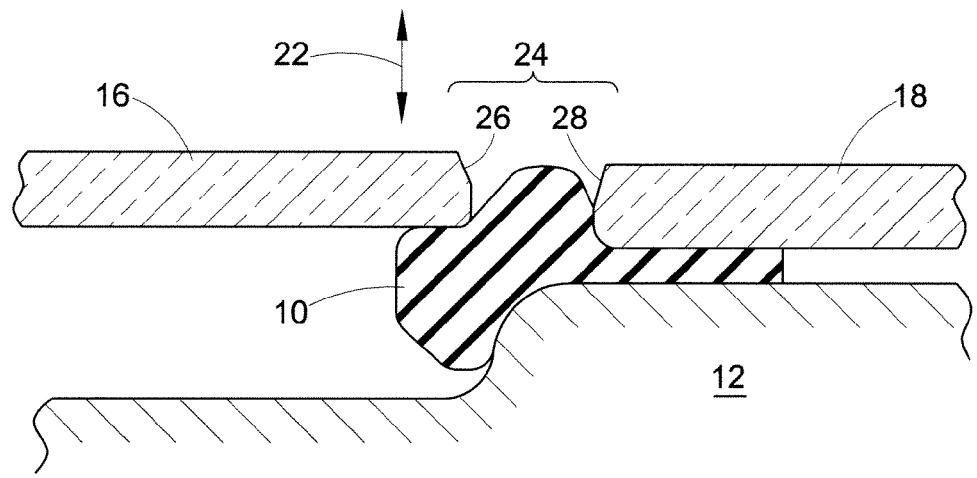
FIG. 1 is a cross-sectional view taken through a vehicle frame, a seal connected to the vehicle frame, and two panels also connected to the vehicle frame.

As is evident when comparing FIG. 4 to FIG. 1, when the movable panel 54 is in the closed position, at least a majority of the surface area of the seal contacting edge 66 of the movable panel 54 contacts the movable-panel-contacting section 96 of the exterior surface 92 of the seal body 90. In other words, the seal 60 contacts the seal-contacting edge 66 of the movable panel 54 at a location nearer the outer surface 64 of the movable panel 54 as compared to the inner surface 62 of the movable panel when the movable panel is in the closed position (FIG. 4).

With continued reference to FIGS. 3 and 4, the external surface 90 includes the panel-contacting section 96, which surrounds at least a portion of a compressible section 106 of the seal body 90. The ambient-contacting section, which in the depicted embodiment is a substantially flat section of the exterior surface 92, is more rigid than the compressible section 106. Because of this, a compressive force applied at a location on the panel-contacting section 96 results in the compressive section 106 compressing and an end of the substantially flat section 94 nearest the panel-contacting section moving in a direction toward the location where the compressive force is applied. As seen when comparing FIG. 3 to FIG. 4, the compressive force can be applied in a direction of arrow 108 by the movable panel 54 on the panel-contacting section 96 of the exterior surface 92 of the seal body 90.

With the movable panel 54 providing a compressive force on the panel-contacting section 96 of the exterior surface 92 of the seal body 90, the compressible section 106 of the seal body then compresses, resulting in the ambient-contacting section of the seal 94 moving, generally pivoting, toward the movable panel 54 to engage the movable panel. The ambient-contacting section 94 of the external surface 92 is more rigid than the compressible section 106. Manners of making the ambient-contacting section 94 being more rigid than the compressible section 106 include having the compressible section being made from a different material than the ambient contacting section and providing a greater density of the material at the ambient-contacting section as compared to the compressible section.

With reference to FIG. 4, the movable panel 54 and the fixed panel 56 define a gap 112 between the movable panel and the fixed panel. When the movable panel 54 is in the closed position (FIG. 4), the gap 112 has an upper boundary surface 114 that is defined by a line in a cross section (the upper boundary would be a surface and the line would reside on the surface) extending from the outer surface 64 of the movable panel 54 to the outer surface 72 of the fixed panel 56. When the movable panel 54 is in the closed position (FIG. 4), the outer surface 64 of the movable panel 54, the boundary surface 114 of the gap 112 and the outer surface 72 of the fixed panel 56 define a substantially smooth continuous surface. In the illustrated embodiment, at least a majority of the ambient-contacting section 94 of the seal 60 resides along the boundary surface 114 when the movable panel is in the closed position. For example, between the edge 66 of the movable panel 54 and the edge 74 of the fixed panel 56, at least a majority of the ambient-contacting section 94 of the seal 60 does not deviate above or below the upper boundary surface 114 of the gap 112. This mitigates creation of any turbulence in the area around the seal 60 when the vehicle is moving at high speeds. This decreases wind noise attributable to the seal arrangement.

The seal arrangement can also be useful as a water dam feature when the movable panel 54 is in an open position (FIG. 3). As mentioned above, the panels 54 and 56 can be roof panels. The ambient-contacting section 94 of the exterior surface 92 of the seal body 90 extends outwardly from and at an obtuse angle φ to the outer surface 72 of the fixed panel 56 when the movable panel 54 is in the open position. Where the movable panel 54 is disposed forwardly from the fixed panel 56, as the vehicle decelerates water droplets D would tend to move toward the direction designated by arrow 116. Where the seal 60, and more particularly the ambient-contacting section 94, extends from and vertically above the outer surface 72 of the fixed panel 56, the seal can prevent water droplets D from entering into the vehicle cabin during deceleration.

Figure 5:
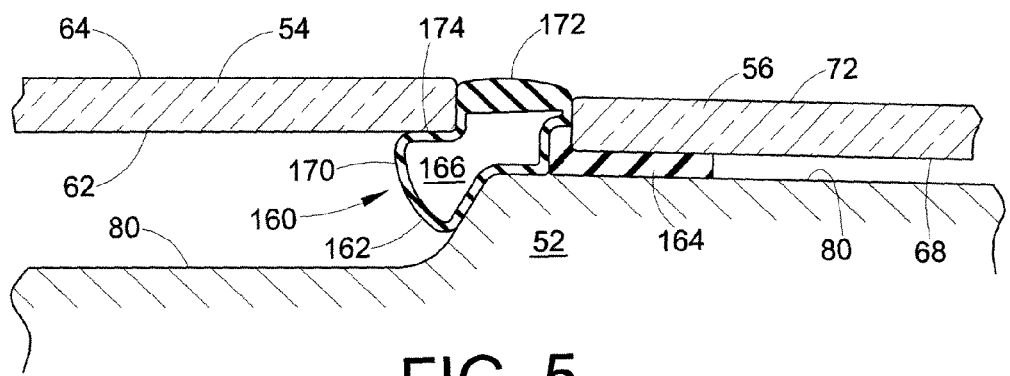
FIG. 5 is a cross-sectional view similar to FIG. 4, but having an alternative seal.

With reference to FIG. 5, an alternative embodiment of a seal arrangement is disclosed. The seal arrangement disclosed in FIG. 5 is similar to the seal arrangement discussed with reference to FIGS. 2-4, therefore only the differences between the seal arrangements will be discussed. In the embodiment illustrated in FIG. 5, a seal 160 includes a resilient body 162 connected with a more rigid body 164. The resilient body 162 and the rigid body 164 can be formed by conventional extrusion or injection molding methods. The resilient body 162 is connected with the rigid body 164. The rigid body 164 is generally L-shaped in cross section and is trapped between the fixed panel 56 and the vehicle body 52.

In the embodiment illustrated in FIG. 5, the flexible body 162 includes a bore 166 thus providing a very compressible body 162. The seal 160 is similar to the seal 60, described above, in that the seal 160 includes an external surface 170 having an ambient-contacting section 172, which is similar to the ambient contacting section 94, and a movable-panel-contacting section 174, which is similar to the movable-panel-contacting section 96 described above. The seal 160 is more rigid adjacent the ambient-contacting section 172, which can also be referred to as a substantially flat section, as compared to the remainder of the seal 160. As can be seen in FIG. 5, the wall thickness of the body 162 of the seal 160 is thicker adjacent the ambient-contacting section 172 as compared to the remainder of the flexible body 162. The seal 160 cooperates in much the same manner as the seal 60 described above. The ambient-contacting section 172 can move and/or pivot in the same manner as the ambient-contacting section 94. Also, the ambient-contacting section 172 can operate as a water dam in the same manner as the ambient-contacting section 94.

A seal assembly, a seal, a roof assembly, and a seal arrangement have been described with reference to particular embodiments. Modifications and alterations will occur to those upon reading and understanding the preceding detailed description. The invention is not to be limited to only the embodiments described above. Instead, the invention is broadly defined by the appended claims and the equivalents thereof.

The invention claimed is:

1. A seal assembly for a vehicle comprising:
a vehicle frame;
a movable glass panel connected with and movable with respect to the vehicle frame between an open position and a closed position;
a fixed glass panel connected with the vehicle frame; and
a seal connected with the vehicle frame, contacting the fixed panel and including a resilient body connected with a more rigid body disposed between the fixed panel and the vehicle frame, the resilient body having an elongate bore and an external surface including a relatively more rigid ambient-contacting section that is in contact with ambient when the movable panel is in the closed position and a movable-panel-contacting section that is in contact with the movable panel when the movable panel is in the closed position, wherein the ambient-contacting section moves from a first inclination when the movable panel is in the open position toward a second inclination as the movable panel contacts the moveable-panel-contacting section and moves toward the closed position.

2. The assembly of claim 1, wherein the resilient body includes a compressible section that is compressed when the movable panel is in the closed position, wherein the resilient body has a greater density of material adjacent the ambient-contacting section as compared to the compressible section.

3. The assembly of claim 1, wherein the ambient-contacting section extends outwardly from and at an obtuse angle to an outer surface of the fixed panel when the moveable panel is in the open position.

4. The assembly of claim 1, wherein the movable-panel-contacting section is generally step shaped in cross section.

5. The assembly of claim 4, wherein the movable-panel-contacting section includes a first leg surface and a second leg surface, wherein the movable panel includes an inner surface and a seal-contacting edge, wherein the first leg surface and the second leg surface intersect to define an angle a when the movable panel is in the closed position, and the inner surface and the seal-contacting edge intersect to define an angle β, wherein α is about equal to β.

6. The assembly of claim 5, wherein $0.9 < \alpha/\beta < 1.1$.

7. The assembly of claim 1, wherein the each panel includes an inner surface, an outer surface and a seal-contacting edge extending between the inner surface and the outer surface, wherein at least a majority of the surface area of each seal-contacting edge contacts the the seal.

8. A seal for an associated vehicle comprising:
a seal body including a compressible section connected with a more rigid section configured to be trapped between a fixed panel and a frame of the associated vehicle;
said compressible section comprising an external surface including a panel-contacting section surrounding at least a portion of the compressible section and an ambient-contacting section that is more rigid than a remainder of the compressible section, wherein a compressive force applied at a location on the panel-contacting-section results in the compressible section compressing and the ambient-contacting section changing inclination such that an end of the ambient-contacting section nearest the panel-contacting section moves in a direction toward the location where the compressive force is applied;
wherein the seal body includes an elongate bore in the compressible section, wherein a wall thickness of the compressible section is thicker adjacent the ambient-contacting section as compared to the remainder of the body.

9. The seal of claim 8, wherein the panel-contacting section is step-shaped.

10. The seal of claim 9, wherein the panel-contacting section includes a first leg surface and a second leg surface, wherein the first leg surface and the second leg surface define an angle $\alpha_1$ when the substantially flat section is in a first orientation and the first leg surface and the second leg surface define an angle $\alpha_2$ when the substantially flat section is in a second orientation, and $\alpha_1 > \alpha_2$.

11. The seal of claim 10, wherein $\alpha_1$ is an obtuse angle.

12. A roof assembly for a vehicle, the assembly comprising:
- a vehicle frame;
- a first glass roof panel connected with the vehicle frame and including an inner surface, an outer surface and a seal-contacting edge between the inner surface and the outer surface, wherein the first roof panel is movable with respect to the vehicle frame between an open position and a closed position;
- a fixed second glass roof panel connected with the vehicle frame; and
- a solid seal contacting the vehicle frame, the first roof panel, and the second roof panel when the first roof panel is in the closed position, the seal including a compressible section, another section trapped between the second roof panel and the vehicle frame and a substantially flat exterior surface, wherein the substantially flat exterior surface is more rigid than the compressible section and moves from a first inclination when the first roof panel is in the open position to a second inclination when the first roof panel is in the closed position.

13. The roof assembly of claim 12, wherein the substantially flat exterior surface of the seal extends upwardly from an outer surface of the second roof panel and at an obtuse angle with respect to the outer surface of the second roof panel when the first roof panel is in the open position.

14. The roof assembly of claim 12, wherein the seal includes a roof panel-contacting section that is step shaped in a cross section taken normal to a longitudinal axis of the seal.

15. The roof assembly of claim 14, wherein the roof panel-contacting section includes a first leg surface and a second leg surface, wherein the first leg surface and the second leg surface define an angle $\alpha_1$ when the first roof panel is in the open position and the first leg surface and the second leg surface define an angle $\alpha_2$ when the first roof panel is in the closed position, and $\alpha_1 > \alpha_2$.

16. The assembly of claim 1, wherein the seal contacts the vehicle frame.

17. The assembly of claim 1, wherein the ambient-contacting section is more rigid than the compressible section by having the compressible section being made from a different material than the ambient-contacting section or by providing a greater density of material at the ambient-contacting section as compared to the compressible section.

18. The seal of claim 8, wherein the ambient-contacting section is more rigid than the compressible section by having the compressible section being made from a different material than the ambient-contacting section or by providing a greater density of material at the ambient-contacting section as compared to the compressible section.

* * * * *